(12) United States Patent
Yen (10) Patent No.: US 12,437,511 B2
(45) Date of Patent: Oct. 7, 2025

(54) IMAGE CLASSIFICATION METHOD, ELECTRONIC DEVICE AND STORAGE MEDIUM

(71) Applicant: HON HAI PRECISION INDUSTRY CO., LTD., New Taipei (TW)

(72) Inventor: Chien-Wu Yen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 366 days.

(21) Appl. No.: 18/108,780

(22) Filed: Feb. 13, 2023

(65) Prior Publication Data

US 2024/0144649 A1 May 2, 2024

(30) Foreign Application Priority Data

Oct. 26, 2022 (CN) .......................... 202211321457.3

(51) Int. Cl.
| | |
|---|---|
| *G06V 10/00* | (2022.01) |
| *G06V 10/75* | (2022.01) |
| *G06V 10/762* | (2022.01) |
| *G06V 10/764* | (2022.01) |
| *G06V 10/82* | (2022.01) |

(52) U.S. Cl.
CPC .......... *G06V 10/764* (2022.01); *G06V 10/751* (2022.01); *G06V 10/762* (2022.01); *G06V 10/82* (2022.01)

(58) Field of Classification Search
CPC .. G06V 10/764; G06V 10/751; G06V 10/762; G06V 10/82; G06V 10/77
See application file for complete search history.

(56) References Cited

FOREIGN PATENT DOCUMENTS

| | | |
|---|---|---|
| TW | I691930 B | 4/2020 |
| TW | 202219891 A | 5/2022 |

OTHER PUBLICATIONS

Panda et al, Conditional Deep Learning for energy-efficient and enhanced pattern recognition, 2016 Design, Automation & Test in Europe Conference & Exhibition (Year: 2016).*
Neshatpour et al, ICNN: An iterative implementation of convolutional neural networks to enable energy and computational complexity aware dynamic approximation, 2018 Design, Automation & Test in Europe Conference & Exhibition (Year: 2018).*
Mirzaeian et al, Conditional Classification: A Solution for Computational Energy Reduction, arXiv:2006.15799v3 (Year: 2006).*

* cited by examiner

*Primary Examiner* — Xiao Liu
(74) *Attorney, Agent, or Firm* — ScienBiziP, P.C.

(57) ABSTRACT

An image classification method applied to an electronic device is provided. The method includes obtaining prediction results of a plurality of test images. A plurality of target images is determined according to the prediction results, and a prediction accuracy rate of a first classification model is calculated based on the plurality of target images. A second classification model is obtained according to the plurality of target images. An initial feature matrix is obtained using the second classification model. An input feature matrix is obtained by performing a dimension raising process on an initial feature matrix. Once a target weight matrix is obtained based on an initial weight matrix, and a target vector is generated according to the target weight matrix and the input feature matrix, a classification result of an image to be classified is obtained by inputting the target vector into a classification layer.

17 Claims, 3 Drawing Sheets

IMAGE CLASSIFICATION METHOD, ELECTRONIC DEVICE AND STORAGE MEDIUM

FIELD

The present disclosure relates to image processing technology, in particular to an image classification method, an electronic device, and a storage medium.

BACKGROUND

In an image classification network, a huge amount of computations required in a fully connected layer requires a long computation time, and such computations slow down the speed of image classification. Therefore, how to improve an efficiency of image classification while ensuring a classification accuracy is a problem currently needs to be solved.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
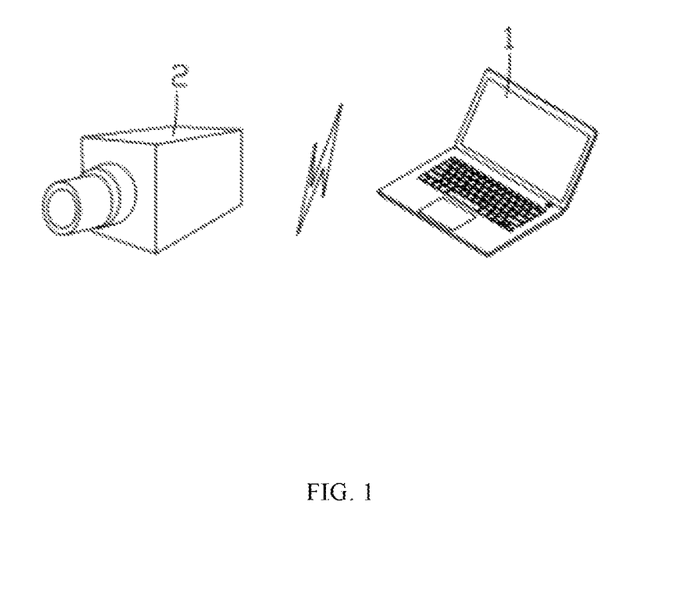
FIG. 1 is an application environment diagram of one embodiment of an image classification method of the present disclosure.

FIG. 1 is an application environment diagram of one embodiment of an image classification method of the present disclosure. The image classification method can be applied to one or more electronic device 1. The one or more electronic device 1 can communicate with a camera device 2, and the camera device 2 may be a camera or other device for capturing images. For example, the camera device 2 can take images of a target object and obtain a plurality of images (hereinafter "images to be classified). The target object may be an animal such as a cat, a dog, or a product such as a water cup, a toy.

The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network in which the electronic device 1 is located includes, but is not limited to, the Internet, a wide area network, a metropolitan area network, a local area network, a virtual private network (VPN), and the like.

Figure 2:
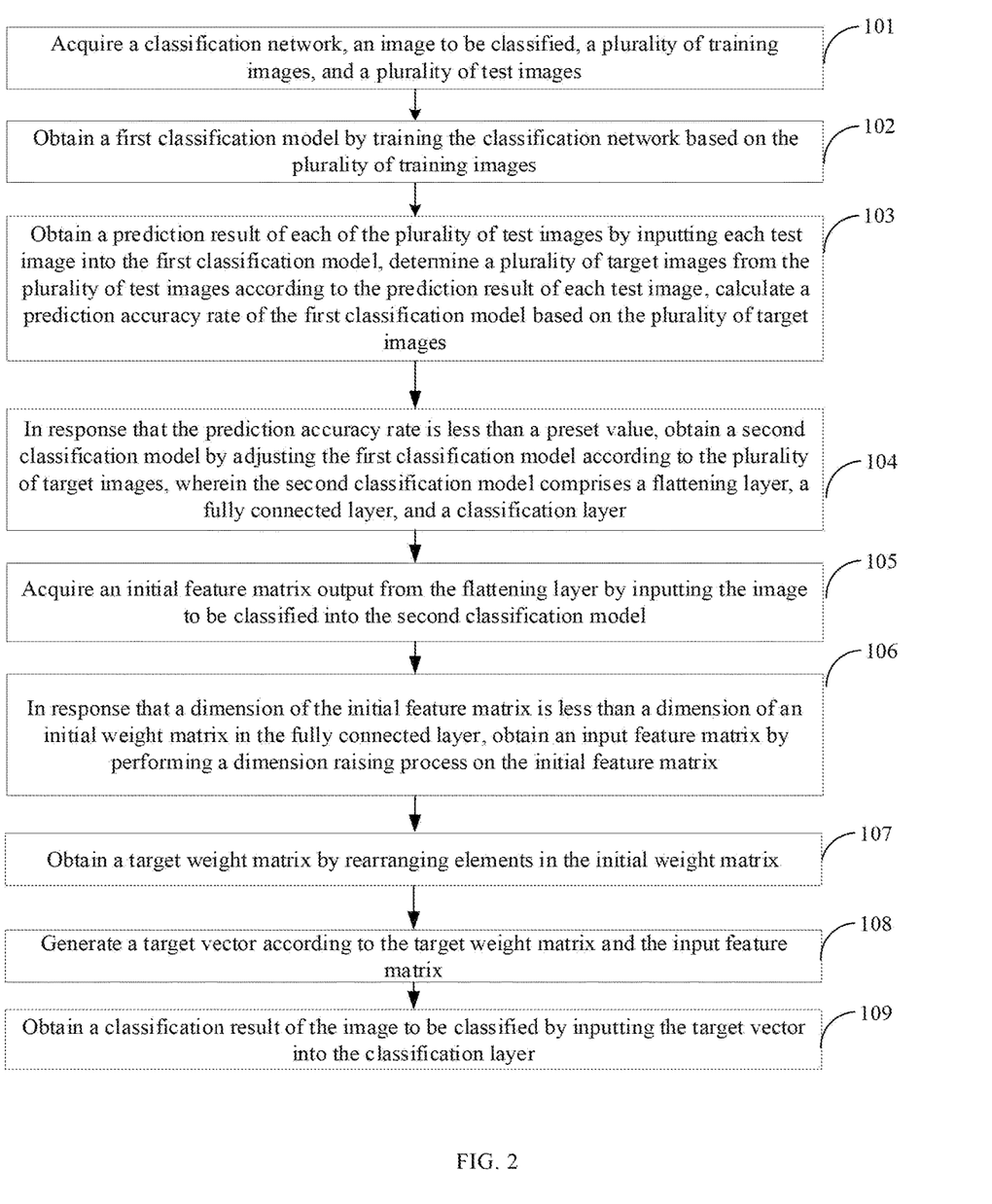
FIG. 2 is a flowchart of one embodiment of the image classification method of the present disclosure.

FIG. 2 is a flowchart of one embodiment of an image classification method of the present disclosure. According to different requirements, a sequence of each block in this flowchart can be adjusted according to actual requirements, and some blocks can be omitted. The execution body of this method can be an electronic device, such as an electronic device 1 shown in FIG. 3.

101, the electronic device acquires a classification network, and acquires an image to be classified, a plurality of training images and a plurality of test images.

In at least one embodiment of the present disclosure, the classification network refers to a network capable of predicting a category of the image to be classified.

In at least one embodiment of the present disclosure, the image to be classified refers to an image that needs to be classified.

In at least one embodiment of the present disclosure, the plurality of training images may be used to train the classification network.

In at least one embodiment of the present disclosure, the plurality of test images refer to images each of which a category is known, and the plurality of test images can be used to calculate an accuracy rate of the classification network.

In at least one embodiment of the present disclosure, the electronic device constructs the classification network based on a convolutional neural network.

The convolutional neural network may be a VGG16 network, a ResNet network, or the like.

In at least one embodiment of the present disclosure, the acquiring of the image to be classified includes:

Obtaining the image to be classified by controlling the camera device to capture an image of one or more objects to be classified.

The one or more objects to be classified may include animals such as a cat, a dog, and/or plants such as flowers.

In at least one embodiment of the present disclosure, the electronic device acquires the plurality of training images from a preset first database.

In at least one embodiment of the present disclosure, the electronic device acquires the plurality of test images and a category label of each test image from a preset second database. Wherein, the category label refers to a real category of the test image. The preset second database may be a database such as CIFAR-10, ImageNet or the like.

In at least one embodiment of the present disclosure, in order to ensure that a brightness and a size of each of the plurality of training images and each of the plurality of test images are more uniform, the plurality of training images and the plurality of test images may be equalized and normalized.

Each of the plurality of training images and the plurality of test images refer to an image of objects include a plurality of types of animals (e.g., puppies, kittens, etc.), and/or plants (e.g., flowers, trees, etc.).

102, the electronic device obtains a first classification model by training the classification network based on the plurality of training images.

In at least one embodiment of the present disclosure, the first classification model refers to a model obtained by training the classification network using the plurality of training images.

In at least one embodiment of the present disclosure, the obtaining of the first classification model by training the classification network based on the plurality of training images includes:

Calculating a loss value of the classification network based on the plurality of training images, and obtaining the first classification model by adjusting the classification network based on the loss value, until the loss value decreases to a minimum value.

Through the above-mentioned embodiment, the classification network is trained based on the loss value until the classification network converges, and the first classification model is obtained, which can improve the classification accuracy of the first classification model.

Specifically, the calculating of the loss value of the classification network based on the plurality of training images includes:

Obtaining an annotation category of each of the plurality of training images by inputting each training image into the classification network, and calculating the loss value based on the plurality of training images and the annotation category of each training image.

The loss value is calculated according to the following formulas:

$$L^{sup} = \sum_{i=1}^{2N} L_i^{sup};$$

$$L_i^{sup} = \frac{-1}{2N_{y_i}-1} \sum_{j=1}^{2N} \|_{i \neq j} \cdot \|_{y_i=y_j} \cdot \log \frac{\exp(z_i \cdot z_j/\tau)}{\sum_{k=1}^{2N} \|_{i \neq k} \cdot \exp(z_i \cdot z_k/\tau)};$$

Wherein, $L^{sup}$ represents the loss value, $L_i^{sup}$ represents a loss value of the ith training image of the plurality of training images, 2N represents a total number of the plurality of training images, and i represents the ith training image of the plurality of training images, $y_i$ represents a label category of the ith training image, j represents the jth training image of the plurality of training images having a same label category as the ith training image, and $y_j$ represents a labeling category of the jth training image, $N_{y_i}$ represents a total number of training images each of which has a same labeling category as the ith training image, $\|_{i \neq j}$ represents a first indicator function, if and only if i=j, $\|_{i \neq j}$ takes zero, when i≠j, $\|_{i \neq j}$ takes 1; $\|_{y_i=y_j}$ represents a second indicator function, $\|_{y_i=y_j}$ takes zero if and only if $y_i=y_j$, $\|_{y_i=y_j}$ takes 1 when $y_i \neq y_j$, $\|_{i \neq k}$ represents a third indicator function, $\|_{i \neq k}$ takes zero if and only if i=k, and $\|_{i \neq k}$ takes 1 when i≠k, $z_i$ represents an unit vector obtained by inputting the ith training image into the classification network, $z_j$ represents a unit vector obtained by inputting the jth training image into the classification network, k represents any training image of the plurality of training images except the ith training image, $z_k$ represents an unit vector obtained by inputting the kth training image into the in the classification network, $\tau$ represents a preset scalar adjustment parameter.

103, the electronic device obtains a prediction result of each of the plurality of test images by inputting each test image into the first classification model, determines a plurality of target images from the plurality of test images according to the prediction result of each test image, calculates a prediction accuracy rate of the first classification model predicting the plurality of test images based on the plurality of target images.

In at least one embodiment of the present disclosure, the prediction accuracy rate refers to a probability that the first classification model correctly classifies the plurality of test images.

In at least one embodiment of the present disclosure, the "obtains a prediction result of each of the plurality of test images by inputting each test image into the first classification model, determines a plurality of target images from the plurality of test images according to the prediction result of each test image, calculates a prediction accuracy rate of the first classification model predicting the plurality of test images based on the plurality of target images" includes:

Acquiring category labels of the plurality of test images; obtaining a prediction result of each of the plurality of test images by inputting each test image into the first classification model; storing the prediction result of each test image; comparing the prediction result of each test image with corresponding category label; determining a target result when the prediction result of each test image is same as corresponding category label; determining the plurality of target images by determining each test image corresponding to each target result as a target image; counting a first number of the plurality of target images and a second number of the plurality of test images; obtaining the prediction accuracy rate by calculating a ratio of the first number to the second number.

Through the above embodiment, the first number of the plurality of target images and the second number of the plurality of test images are counted, and the ratio of the first number to the second number is calculated, so that the prediction accuracy rate of the first classification model can be obtained quickly.

104, if the prediction accuracy rate is less than a preset value, the electronic device obtains a second classification model by adjusting the first classification model according to the plurality of target images, wherein the second classification model includes a flattening layer, a fully connected layer and a classification layer.

In at least one embodiment of the present disclosure, the obtaining of the second classification model by adjusting the first classification model according to the plurality of target images includes:

Generating a plurality of cluster centers by performing clustering processing on the plurality of target images; training the first classification model using target images corresponding to each of the plurality of cluster centers; obtaining the second classification model by training the first classification model until the prediction accuracy rate is greater than or equal to the preset value.

Wherein, this embodiment performs clustering processing on the plurality of target images based on a K-means clustering algorithm to generate the plurality of cluster centers.

The preset value can be set according to requirements, which is not limited in the present disclosure.

Through the above-mentioned embodiment, the target images are selected by the clustering algorithm to adjust the first classification model until the prediction accuracy rate of the first classification model is greater than the preset value, and the second classification model is obtained, which can improve the prediction accuracy rate of the second classification model. Since the target images are all test images which are correctly classified, the adjustment using the target images can improve the classification ability of the second classification model.

In other embodiments of the present disclosure, if the cluster center includes at least one target image, the at least one target image is input into the first classification model for training, if the cluster center does not include any target image, a target image closest to the cluster center is input into the first classification model for training.

In other embodiments of the present disclosure, after the first classification model is adjusted by using the target image corresponding to each cluster center, when the adjusted prediction accuracy rate cannot be greater than or equal to the preset value, the plurality of target images need to be re-clustered to generate a plurality of new cluster centers to re-train the first classification model.

105, the electronic device acquires an initial feature matrix output from the flattening layer by inputting the image to be classified into the second classification model.

In at least one embodiment of the present disclosure, the initial feature matrix refers to a matrix obtained by performing a dimension reduction operation on the flattening layer.

In at least one embodiment of the present disclosure, the second classification model includes a convolution layer, and the acquiring of the initial feature matrix output from the flattening layer by inputting the image to be classified into the second classification model includes:

Obtaining a target matrix by inputting the image to be classified into the convolutional layer for feature extraction; obtaining an operation result by performing a multiplying operation on a plurality of dimension values of the target matrix; setting a value 1 as a number of rows; taking the operation result as a number of columns; transforming the target matrix into the initial feature matrix based on the number of rows and the number of columns, a dimension of the initial feature matrix is two.

Wherein, a dimension of the target matrix is greater than or equal to three.

A generation process of the initial feature matrix is basically the same as an inverse generation process of the input feature matrix below, which is not repeated in the present disclosure.

Through the above-mentioned embodiment, a high-dimensional target matrix output from the convolutional layer is subjected to dimensionality reduction processing to obtain the initial feature matrix, and a dimension size of the initial feature matrix can be controlled through the dimensionality reduction operation.

106, if a dimension of the initial feature matrix is less than a dimension of an initial weight matrix in the fully connected layer, the electronic device obtains an input feature matrix by performing a dimension raising process on the initial feature matrix.

In at least one embodiment of the present disclosure, the input feature matrix refers to a matrix whose dimension is the same as that of the initial weight matrix.

In at least one embodiment of the present disclosure, the obtaining of the input feature matrix by performing the dimension raising process on the initial feature matrix includes:

Counting a number of rows of the initial feature matrix and counting a number of columns of the initial feature matrix; obtaining a target product by multiplying the number of rows and the number of columns; obtaining a plurality of prime factors by decomposing the target product; combining any two same prime factors among the plurality of prime factors into a prime factor pair, and obtaining a plurality of prime factor pairs; obtaining a feature product by calculating a product of the two prime factors in each of the plurality of prime factor pairs, wherein each prime factor can only be combined once; selecting a plurality of target prime factor pairs from the plurality of prime factor pairs according to the target product and the feature product; obtaining a characteristic prime factor by extracting a prime factor from each of the plurality of target prime factor pairs; generating a characteristic value according to a logarithm of the plurality of target prime factor pairs and each characteristic prime factor; replacing each target prime factor pair with zero among the plurality of prime factors; obtaining a target value by multiplying all non-zero prime factors after completing the replacement; obtaining the input feature matrix by performing the dimension raising processing on the initial feature matrix based on a configuration value, the target value and the characteristic value.

The target prime factor pair refers to a prime factor pair whose feature product is divisible by the target product, and the configuration value is a value of 1.

It can be understood that the target product is sufficiently large and non-prime to ensure that there must be at least two identical prime factors in the plurality of prime factors.

Specifically, the "generating a characteristic value according to a logarithm of the plurality of target prime factor pairs and each characteristic prime factor" includes:

If the logarithm of the plurality of target prime factor pairs is single, determining the characteristic prime factor as the characteristic value; if the logarithm of the plurality of target prime factor pairs is multiple, obtaining the characteristic value by multiplying the characteristic prime factors.

Specifically, the obtaining of the input feature matrix by performing the dimension raising processing on the initial feature matrix based on the configuration value, the target value, and the characteristic value includes:

Determining the configuration value as a batch size, determining the target value as a number of channels, and determining the characteristic value as the number of rows and the number of columns.

For example, the number of rows of the initial feature matrix is 1, and the number of columns of the initial feature matrix is 60, that is, the initial feature matrix is: [1,1,1,1,1, 3,3,3,3,3,2,2,2,2,2, 2,2,2,2,2,3,3,3,3,3,1,1,1,1,1, 2,2,2,2,2,3, 3,3,3,3,1,1,1,1,1, 1,1,1,1,1,3,3,3,3,3,2,2,2,2,2].

The configuration value is 1, the target value calculated by the above method is 15, and the characteristic value is 2. Based on the configuration value 1, the target value 15, and the characteristic value 2, the dimension raising processing is performed on the initial characteristic matrix obtain the input feature matrix, wherein the input feature matrix is:

$$\left[\begin{bmatrix}1 & 1\\1 & 1\end{bmatrix}, \begin{bmatrix}1 & 3\\3 & 3\end{bmatrix}, \begin{bmatrix}3 & 3\\2 & 2\end{bmatrix}, \begin{bmatrix}2 & 2\\2 & 2\end{bmatrix}, \begin{bmatrix}2 & 2\\2 & 2\end{bmatrix}, \begin{bmatrix}3 & 3\\3 & 3\end{bmatrix}, \begin{bmatrix}3 & 1\\1 & 1\end{bmatrix}, \begin{bmatrix}1 & 1\\2 & 2\end{bmatrix}, \begin{bmatrix}2 & 2\\2 & 3\end{bmatrix},$$

-continued
$$\begin{bmatrix} 3 & 3 \\ 3 & 3 \end{bmatrix}, \begin{bmatrix} 1 & 1 \\ 1 & 1 \end{bmatrix}, \begin{bmatrix} 1 & 1 \\ 1 & 1 \end{bmatrix}, \begin{bmatrix} 1 & 1 \\ 3 & 3 \end{bmatrix}, \begin{bmatrix} 3 & 3 \\ 3 & 2 \end{bmatrix}, \begin{bmatrix} 2 & 2 \\ 2 & 2 \end{bmatrix}\end{bmatrix}.$$

The input feature matrix includes a three-dimensional matrix, that is, the three-dimensional matrix includes 15 two-dimensional matrices, and the number of rows and columns of each two-dimensional matrix is 2.

In this embodiment, when the initial weight matrix in the fully connected layer has four dimensions, by uniformly converting the dimension of the initial feature matrix to be four-dimensional, it can be ensured that the dimension of the input feature matrix input to the fully connected layer is the same as the dimension of the initial weight matrix.

Through the above embodiment, the dimension of the initial feature matrix is converted to be consistent with the dimension of the initial weight matrix, so that the input feature matrix can be directly multiplied with the initial weight matrix, so that the multiple two-dimensional matrices in the input feature matrix can be directly added to the operation, since a number of parameters of each operation is increased, an operation speed of the fully connected layer can be improved.

107, the electronic device obtains a target weight matrix by rearranging elements in the initial weight matrix.

In at least one embodiment of the present disclosure, the target weight matrix refers to a matrix whose elements are rearranged.

In at least one embodiment of the present disclosure, the obtaining of the target weight matrix by rearranging elements in the initial weight matrix includes:

Determining a last element of each column in the initial weight matrix as a target element of each column; obtaining the target weight matrix by repeatedly adjusting an element at a head position of each column to a tail position of each column, and sequentially moving a position of each of other elements of each column to the head position of each column, until the target element of each column moves to the head position of each column.

Through the above implementation, all elements in the initial weight matrix can be rearranged, so that an operation order of the elements in the initial weight matrix is more conducive to a fast multiplication operation with the input feature matrix.

108, the electronic device generates a target vector according to the target weight matrix and the input feature matrix.

In at least one embodiment of the present disclosure, the target vector refers to a multiplication result of the target weight matrix and the input feature matrix.

In at least one embodiment of the present disclosure, the generating of the target vector according to the target weight matrix and the input feature matrix includes:

Obtaining the target vector by multiplying the target weight matrix and the input feature matrix.

Through the above-mentioned embodiment, since the operation order of the elements in the target weight matrix is changed, it can be ensured that the elements in the input feature matrix can have corresponding elements in the target weight matrix in each operation. The effectiveness of the operation is improved, and the operation time is reduced.

109, the electronic device obtains a classification result of the image to be classified by inputting the target vector into the classification layer.

In at least one embodiment of the present disclosure, the classification result refers to a category of the image to be classified predicted by the second classification model. The classification result may include categories such as cats and dogs.

In at least one embodiment of the present disclosure, the obtaining of the classification result of the image to be classified by inputting the target vector into the classification layer includes:

Obtaining a probability of each category by inputting the target vector into the classification layer; taking a category corresponding to the probability with the largest value as the classification result.

Wherein, the classification layer may be a softmax classifier.

By determining the category corresponding to the probability with the largest value as the classification result, the accuracy of the classification result can be improved.

It can be seen from the above technical solutions that the present disclosure calculates the prediction accuracy rate of the first classification model predicting the plurality of test images, and then compares the prediction accuracy rate with the preset value to determine whether or not to adjust the first classification model, so as to improve the prediction ability of the second classification model. Since only the target images are used to adjust the first classification model in the adjustment process, a calculation amount in the adjustment process can be reduced, thereby, a generation efficiency of the second classification model is improved, the image to be classified is input into the second classification model, and the initial feature matrix output from the flattening layer is obtained, if the dimension of the initial feature matrix is less than the dimension of the initial weight matrix in the fully connected layer, the initial feature matrix is dimensionally increased to obtain an input feature matrix. By changing the dimension of the input feature matrix, the amount of parameters for each operation can be increased; the initial weight matrix of the fully connected layer is obtained, and the elements of the initial weight matrix are rearranged to obtain the target weight matrix; the target weight matrix and the input feature matrix are multiplied and accumulated to obtain a target vector; and the target vector is input into the classification layer to obtain the classification result of the image to be classified; after the elements are rearranged, the operation order of the elements is changed, which can ensure that the elements in the weight matrix will participate in the operation in each operation, thereby avoiding the output of blank results (that is, avoiding invalid operations), thereby reducing the number of operations and the time spent in the operation, and can therefore speed up the speed of image classification.

Figure 3:
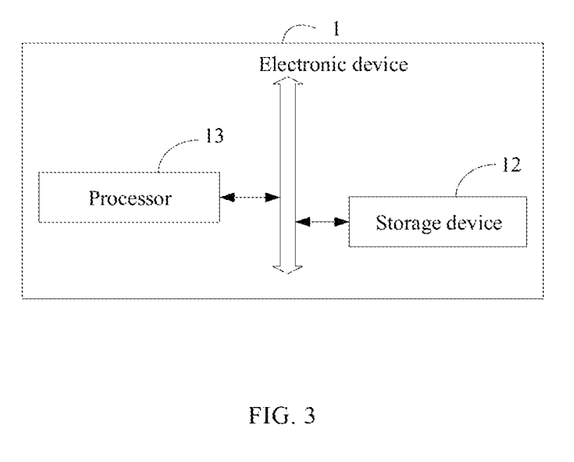
FIG. 3 is a schematic structural diagram of one embodiment of an electronic device of the present disclosure.

As shown in FIG. 3, it is a structural diagram of an electronic device according to one embodiment of the image classification method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of image classification.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the foregoing image classification method, for example, to implement each block shown in FIG. 2.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 2, the storage device 12 in the electronic device 1 stores a plurality of instructions to implement the image classification method, and the processor 13 can acquire the plurality of instructions to implement processes of: acquiring a classification network, an image to be classified, a plurality of training images, and a plurality of test images; obtaining a first classification model by training the classification network based on the plurality of training images; obtaining a prediction result of each of the plurality of test images by inputting each test image into the first classification model, determining a plurality of target images from the plurality of test images according to the prediction result of each test image, calculating a prediction accuracy rate of the first classification model based on the plurality of target images; in response that the prediction accuracy rate is less than a preset value, obtaining a second classification model by adjusting the first classification model according to the plurality of target images, wherein the second classification model comprises a flattening layer, a fully connected layer, and a classification layer; acquiring an initial feature matrix output from the flattening layer by inputting the image to be classified into the second classification model; in response that a dimension of the initial feature matrix is less than a dimension of an initial weight matrix in the fully connected layer, obtaining an input feature matrix by performing a dimension raising process on the initial feature matrix; obtaining a target weight matrix by rearranging elements in the initial weight matrix; generating a target vector according to the target weight matrix and the input feature matrix; and obtaining a classification result of the image to be classified by inputting the target vector into the classification layer.

Specifically, for the specific implementation method of the above-mentioned instruction by the processor 13, reference may be made to the description of the relevant blocks in the corresponding embodiment of FIG. 1, and details are not repeated.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts mayor may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image classification method applied to an electronic device, the method comprising:
   acquiring a classification network, an image to be classified, a plurality of training images, and a plurality of test images;
   obtaining a first classification model by training the classification network based on the plurality of training images, comprising: calculating a loss value of the classification network based on the plurality of training images; and obtaining the first classification model by adjusting the classification network based on the loss value, until the loss value decreases to a minimum value;
   obtaining a prediction result of each test image of the plurality of test images by inputting each test image into the first classification model, determining a plurality of target images from the plurality of test images according to the prediction result of each test image, calculating a prediction accuracy rate of the first classification model based on the plurality of target images;
   in response that the prediction accuracy rate is less than a preset value, obtaining a second classification model by adjusting the first classification model according to the plurality of target images, the second classification model comprising a flattening layer, a fully connected layer, and a classification layer;
   acquiring an initial feature matrix output from the flattening layer by inputting the image to be classified into the second classification model;
   in response that a dimension of the initial feature matrix is less than a dimension of an initial weight matrix in the fully connected layer, obtaining an input feature matrix by performing a dimension raising process on the initial feature matrix;
   obtaining a target weight matrix by rearranging elements in the initial weight matrix;
   generating a target vector according to the target weight matrix and the input feature matrix; and
   obtaining a classification result of the image to be classified by inputting the target vector into the classification layer.

2. The image classification method according to claim 1, wherein the calculating of the loss value of the classification network based on the plurality of training images comprises:
   obtaining an annotation category of each of the plurality of training images by inputting each training image into the classification network, and calculating the loss value based on the plurality of training images and the annotation category of each training image;
   wherein the loss value is calculated according to formulas:

$$L^{sup} = \sum_{i=1}^{2N} L_i^{sup};$$

$$L_i^{sup} = \frac{-1}{2N_{y_i} - 1} \sum_{j=1}^{2N} \|_{i \neq j} \cdot \|_{y_i = y_j} \cdot \log \frac{\exp(z_i \cdot z_j / \tau)}{\sum_{k=1}^{2N} \|_{i \neq k} \cdot \exp(z_i \cdot z_k / \tau)};$$

wherein, $L^{sup}$ represents the loss value, $L_i^{sup}$ represents a loss value of the ith training image of the plurality of training images, 2N represents a total number of the plurality of training images, and i represents the ith training image of the plurality of training images, $y_i$ represents a label category of the ith training image, j represents the jth training image of the plurality of training images having a same label category as the ith training image, and $y_j$ represents a labeling category of the jth training image, $N_{y_j}$ represents a total number of training images each of which has a same labeling category as the ith training image, $\|_{i \neq j}$ represents a first indicator function, if and only if i=j, $\|_{i \neq j}$ takes zero, when i≠j, $\|_{i \neq j}$ takes 1; $\|_{y_i = y_j}$ represents a second indicator function, $\|_{y_i = y_j}$ takes zero if and only if $y_i = y_j$, $\|_{y_i = y_j}$ takes 1 when $y_i \neq y_j$, $\|_{i \neq k}$ represents a third indicator function, $\|_{i \neq k}$ takes zero if and only if i=k, and $\|_{i \neq k}$ takes 1 when i≠k, $z_i$ represents an unit vector obtained by inputting the ith training image into the classification network, $z_j$ represents a unit vector obtained by inputting the jth training image into the classification network, k represents any training image of the plurality of training images except the ith training image, $z_k$ represents an unit vector obtained by inputting the kth training image into the in the classification network, τ represents a preset scalar adjustment parameter.

3. The image classification method according to claim 1, wherein the "obtaining a prediction result of each of the plurality of test images by inputting each test image into the first classification model, determining a plurality of target images from the plurality of test images according to the prediction result of each test image, calculating a prediction accuracy rate of the first classification model based on the plurality of target images" comprises:
   acquiring category labels of the plurality of test images;
   obtaining a prediction result of each of the plurality of test images by inputting each test image into the first classification model;
   comparing the prediction result of each test image with corresponding category label;
   determining a target result when the prediction result of each test image is same to corresponding category label;
   determining the plurality of target images by determining each test image corresponding to each target result as a target image;
   counting a first number of the plurality of target images and a second number of the plurality of test images; and
   obtaining the prediction accuracy rate by calculating a ratio of the first number to the second number.

4. The image classification method according to claim 1, wherein the obtaining of the second classification model by adjusting the first classification model according to the plurality of target images comprises:
  generating a plurality of cluster centers by performing clustering processing on the plurality of target images;
  training the first classification model using target images corresponding to each of the plurality of cluster centers; and obtaining the second classification model by training the first classification model until the prediction accuracy rate is greater than or equal to the preset value.

5. The image classification method according to claim 1, wherein the obtaining of the input feature matrix by performing the dimension raising process on the initial feature matrix comprises:
  counting a number of rows of the initial feature matrix and counting a number of columns of the initial feature matrix;
  obtaining a target product by multiplying the number of rows and the number of columns;
  obtaining a plurality of prime factors by decomposing the target product;
  combining any two same prime factors among the plurality of prime factors into a prime factor pair, and obtaining a plurality of prime factor pairs; obtaining a feature product by calculating a product of the two prime factors in each of the plurality of prime factor pairs, wherein each prime factor can only be combined once;
  selecting a plurality of target prime factor pairs from the plurality of prime factor pairs according to the target product and the feature product;
  obtaining a characteristic prime factor by extracting a prime factor from each of the plurality of target prime factor pairs;
  generating a characteristic value according to a logarithm of the plurality of target prime factor pairs and each characteristic prime factor;
  replacing each target prime factor pair with zero among the plurality of prime factors; and
  obtaining a target value by multiplying all non-zero prime factors; and
  obtaining the input feature matrix by performing the dimension raising processing on the initial feature matrix based on a configuration value, the target value and the characteristic value.

6. The image classification method according to claim 1, wherein the obtaining of the target weight matrix by rearranging elements in the initial weight matrix comprises:
  determining a last element of each column in the initial weight matrix as a target element of each column;
  obtaining the target weight matrix by repeatedly adjusting an element at a head position of each column to a tail position of each column, and sequentially moving a position of each of other elements of each column to the head position of each column, until the target element of each column moves to the head position of each column.

7. The image classification method according to claim 1, wherein the generating of the target vector according to the target weight matrix and the input feature matrix comprises:
  obtaining the target vector by multiplying the target weight matrix and the input feature matrix.

8. An electronic device comprising:
  a storage device;
  at least one processor; and
  the storage device storing one or more programs, which when executed by the at least one processor, cause the at least one processor to:
  acquire a classification network, an image to be classified, a plurality of training images, and a plurality of test images;
  obtain a first classification model by training the classification network based on the plurality of training images, comprising: calculating a loss value of the classification network based on the plurality of training images; and obtaining the first classification model by adjusting the classification network based on the loss value, until the loss value decreases to a minimum value;
  obtain a prediction result of each test image of the plurality of test images by inputting each test image into the first classification model, determine a plurality of target images from the plurality of test images according to the prediction result of each test image, calculate a prediction accuracy rate of the first classification model based on the plurality of target images;
  in response that the prediction accuracy rate is less than a preset value, obtain a second classification model by adjusting the first classification model according to the plurality of target images, the second classification model comprising a flattening layer, a fully connected layer, and a classification layer;
  acquire an initial feature matrix output from the flattening layer by inputting the image to be classified into the second classification model;
  in response that a dimension of the initial feature matrix is less than a dimension of an initial weight matrix in the fully connected layer, obtain an input feature matrix by performing a dimension raising process on the initial feature matrix;
  obtain a target weight matrix by rearranging elements in the initial weight matrix;
  generate a target vector according to the target weight matrix and the input feature matrix; and
  obtain a classification result of the image to be classified by inputting the target vector into the classification layer.

9. The electronic device according to claim 2, wherein the calculating of the loss value of the classification network based on the plurality of training images comprises:
  obtaining an annotation category of each of the plurality of training images by inputting each training image into the classification network, and calculating the loss value based on the plurality of training images and the annotation category of each training image;
  wherein the loss value is calculated according to formulas:

$$L^{sup} = \sum_{i=1}^{2N} L_i^{sup};$$

$$L_i^{sup} = \frac{-1}{2N_{y_i}-1} \sum_{j=1}^{2N} \|_{i \neq j} \cdot \|_{y_i = y_j} \cdot \log \frac{\exp(z_i \cdot z_j/\tau)}{\sum_{k=1}^{2N} \|_{i \neq k} \cdot \exp(z_i \cdot z_k/\tau)};$$

wherein, $L^{sup}$ represents the loss value, $L_i^{sup}$ represents a loss value of the ith training image of the plurality of training images, 2N represents a total number of the plurality of training images, and i represents the ith training image of the plurality of training images, $y_i$ represents a label category of the ith training image, j represents the jth training image of the plurality of training images having a same label category as the ith training image, and $y_j$ represents a labeling category of the jth training image, $N_{yi}$ represents a total number of training images each of which has a same labeling category as the ith training image, $\|_{i=j}$ represents a first indicator function, if and only if i=j, $\|_{i=j}$ takes zero, when i≠j, $\|_{i\neq j}$ takes 1; $\|_{yi=y_j}$ represents a second indicator function, $\|_{yi=y_j}$ takes zero if and only if $y_i=y_j$, $\|_{yi=y_j}$ takes 1 when $y_i \neq y_j$, $\|_{i=k}$ represents a third indicator function, $\|_{i\neq k}$ takes zero if and only if i=k, and $\|_{i\neq k}$ takes 1 when i≠k, $z_i$ represents an unit vector obtained by inputting the ith training image into the classification network, $z_j$ represents a unit vector obtained by inputting the jth training image into the classification network, k represents any training image of the plurality of training images except the ith training image, $z_k$ represents an unit vector obtained by inputting the kth training image into the in the classification network, τ represents a preset scalar adjustment parameter.

10. The electronic device according to claim 8, wherein the "obtain a prediction result of each of the plurality of test images by inputting each test image into the first classification model, determine a plurality of target images from the plurality of test images according to the prediction result of each test image, calculate a prediction accuracy rate of the first classification model based on the plurality of target images" comprises:

acquiring category labels of the plurality of test images;
obtaining a prediction result of each of the plurality of test images by inputting each test image into the first classification model;
comparing the prediction result of each test image with corresponding category label;
determining a target result when the prediction result of each test image is same to corresponding category label;
determining the plurality of target images by determining each test image corresponding to each target result as a target image;
counting a first number of the plurality of target images and a second number of the plurality of test images; and
obtaining the prediction accuracy rate by calculating a ratio of the first number to the second number.

11. The electronic device according to claim 8, wherein the obtaining of the second classification model by adjusting the first classification model according to the plurality of target images comprises:

generating a plurality of cluster centers by performing clustering processing on the plurality of target images;
training the first classification model using target images corresponding to each of the plurality of cluster centers; and obtaining the second classification model by training the first classification model until the prediction accuracy rate is greater than or equal to the preset value.

12. The electronic device according to claim 8, wherein the obtaining of the input feature matrix by performing the dimension raising process on the initial feature matrix comprises:

counting a number of rows of the initial feature matrix and counting a number of columns of the initial feature matrix;
obtaining a target product by multiplying the number of rows and the number of columns;
obtaining a plurality of prime factors by decomposing the target product;
combining any two same prime factors among the plurality of prime factors into a prime factor pair, and obtaining a plurality of prime factor pairs; obtaining a feature product by calculating a product of the two prime factors in each of the plurality of prime factor pairs, wherein each prime factor can only be combined once;
selecting a plurality of target prime factor pairs from the plurality of prime factor pairs according to the target product and the feature product;
obtaining a characteristic prime factor by extracting a prime factor from each of the plurality of target prime factor pairs;
generating a characteristic value according to a logarithm of the plurality of target prime factor pairs and each characteristic prime factor;
replacing each target prime factor pair with zero among the plurality of prime factors; and
obtaining a target value by multiplying all non-zero prime factors; and
obtaining the input feature matrix by performing the dimension raising processing on the initial feature matrix based on a configuration value, the target value and the characteristic value.

13. The electronic device according to claim 8, wherein the obtaining of the target weight matrix by rearranging elements in the initial weight matrix comprises:

determining a last element of each column in the initial weight matrix as a target element of each column;
obtaining the target weight matrix by repeatedly adjusting an element at a head position of each column to a tail position of each column, and sequentially moving a position of each of other elements of each column to the head position of each column, until the target element of each column moves to the head position of each column.

14. The electronic device according to claim 8, wherein the generating of the target vector according to the target weight matrix and the input feature matrix comprises:

obtaining the target vector by multiplying the target weight matrix and the input feature matrix.

15. A non-transitory storage medium having instructions stored thereon, when the instructions are executed by a processor of an electronic device, the processor is caused to perform an image classification method, wherein the method comprises:

acquiring a classification network, an image to be classified, a plurality of training images, and a plurality of test images;
obtaining a first classification model by training the classification network based on the plurality of training images, comprising: calculating a loss value of the classification network based on the plurality of training images; and obtaining the first classification model by adjusting the classification network based on the loss value, until the loss value decreases to a minimum value;
obtaining a prediction result of each test image of the plurality of test images by inputting each test image into the first classification model, determining a plurality of target images from the plurality of test images according to the prediction result of each test image, calculating a prediction accuracy rate of the first classification model based on the plurality of target images;

in response that the prediction accuracy rate is less than a preset value, obtaining a second classification model by adjusting the first classification model according to the plurality of target images, the second classification model comprising a flattening layer, a fully connected layer, and a classification layer;

acquiring an initial feature matrix output from the flattening layer by inputting the image to be classified into the second classification model;

in response that a dimension of the initial feature matrix is less than a dimension of an initial weight matrix in the fully connected layer, obtaining an input feature matrix by performing a dimension raising process on the initial feature matrix;

obtaining a target weight matrix by rearranging elements in the initial weight matrix;

generating a target vector according to the target weight matrix and the input feature matrix; and obtaining a classification result of the image to be classified by inputting the target vector into the classification layer.

16. The non-transitory storage medium according to claim 15, wherein the calculating of the loss value of the classification network based on the plurality of training images comprises:

obtaining an annotation category of each of the plurality of training images by inputting each training image into the classification network, and calculating the loss value based on the plurality of training images and the annotation category of each training image;

wherein the loss value is calculated according to formulas:

$$L^{sup} = \sum_{i=1}^{2N} L_i^{sup};$$

$$L_i^{sup} = \frac{-1}{2N_{y_i} - 1} \sum_{j=1}^{2N} \|_{i \neq j} \cdot \|_{y_i = y_j} \cdot \log \frac{\exp(z_i \cdot z_j / \tau)}{\sum_{k=1}^{2N} \|_{i \neq k} \cdot \exp(z_i \cdot z_k / \tau)};$$

wherein, $L^{sup}$ represents the loss value, $L_i^{sup}$ represents a loss value of the ith training image of the plurality of training images, 2N represents a total number of the plurality of training images, and i represents the ith training image of the plurality of training images, $y_i$ represents a label category of the ith training image, j represents the jth training image of the plurality of training images having a same label category as the ith training image, and $y_j$ represents a labeling category of the jth training image, $N_{y_i}$ represents a total number of training images each of which has a same labeling category as the ith training image, $\|_{i \neq j}$ represents a first indicator function, if and only if i=j, $\|_{i \neq j}$ takes zero, when i≠j, $\|_{i \neq j}$ takes 1; $\|_{y_i = y_j}$ represents a second indicator function, $\|_{y_i = y_j}$ takes zero if and only if $y_i = y_j$, $\|_{y_i = y_j}$ takes 1 when $y_i \neq y_j$, $\|_{i \neq k}$ represents a third indicator function, $\|_{i \neq k}$ takes zero if and only if i=k, and $\|_{i \neq k}$ takes 1 when i≠k, $z_i$ represents an unit vector obtained by inputting the ith training image into the classification network, $z_j$ represents a unit vector obtained by inputting the jth training image into the classification network, k represents any training image of the plurality of training images except the ith training image, $z_k$ represents an unit vector obtained by inputting the kth training image into the in the classification network, τ represents a preset scalar adjustment parameter.

17. The non-transitory storage medium according to claim 15, wherein the "obtaining a prediction result of each of the plurality of test images by inputting each test image into the first classification model, determining a plurality of target images from the plurality of test images according to the prediction result of each test image, calculating a prediction accuracy rate of the first classification model based on the plurality of target images" comprises:

acquiring category labels of the plurality of test images;

obtaining a prediction result of each of the plurality of test images by inputting each test image into the first classification model;

comparing the prediction result of each test image with corresponding category label;

determining a target result when the prediction result of each test image is same to corresponding category label;

determining the plurality of target images by determining each test image corresponding to each target result as a target image;

counting a first number of the plurality of target images and a second number of the plurality of test images; and obtaining the prediction accuracy rate by calculating a ratio of the first number to the second number.

* * * * *